June 27, 1967 R. H. UDEN 3,327,699
COMBINATION INCINERATOR AND BARBECUE GRILL
Filed Dec. 2, 1965

INVENTOR
RUPERT H. UDEN
BY
Robert Henderson
ATTORNEY

United States Patent Office 3,327,699
Patented June 27, 1967

3,327,699
COMBINATION INCINERATOR AND BARBECUE GRILL
Rupert H. Uden, Juniata, Nebr. 68955
Filed Dec. 2, 1965, Ser. No. 511,191
4 Claims. (Cl. 126—25)

This invention relates to a fireplace and more particularly to a combined incinerator and barbecue grill.

An object of this invention is the provision of a combination incinerator and barbecue grill which can be used either for the incineration of leaves and trash or the barbecuing of food.

Another object of this invention is to provide a combination incinerator and barbecue grill wherein the configuration of the interior increases the draft characteristics necessary to assist the burning of leaves and trash.

A further object of this invention is the provision of a combination incinerator and barbecue grill wherein the rising heat from the burning charcoal is caused to converge, thus concentrating on the underside surface of the cooking food.

Another object of this invention is the provision of a combination incinerator and barbecue grill which can be readily assembled without the requirement of any special skill.

A further object of this invention is the provision of a combination incinerator and barbecue grill wherein the ashes and debris created by incineration or barbecuing can be easily removed.

It is yet another object of this invention to provide a combination incinerator and barbecue grill which is economical to manufacture, extremely compact and functional in use and appearance, and simple but rugged in construction.

These objects, and other features and advantages of this invention will become more readily apparent upon reference to the following description, when taken in conjunction with the accompanying drawings, wherein.

Figure 1:
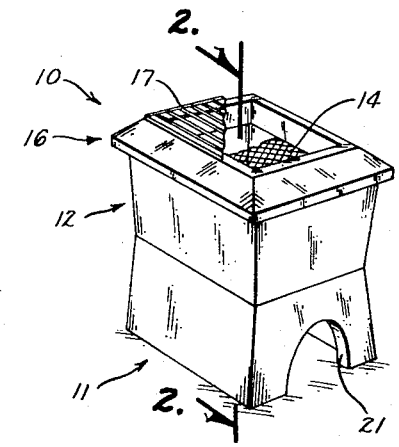
FIG. 1 is a perspective view of the combination incinerator and barbecut grill of this invention.

Referring now to the drawing, the combination incinerator-barbecue grill of this invention is indicated generally at 10 in FIG. 1, and is used either for the incineration of leaves and trash or for the barbecuing of food.

The incinerator-barbecue grill 10 (FIG. 3) comprises a base 11, a housing 12, a trash grate 13, a charcoal grate 14, a top 16 and a grill 17.

More specifically, the base 11 (FIG. 3) has four side walls 18 which form an inverted, frusto-pyramidal shaped first enclosure 19, that is open at the top and bottom. A semi-oval shaped opening 21 is formed in one of the side walls 18, and serves a two-fold purpose as a draft opening and as an access to the enclosure 19.

Mounted on the base 11 (FIG. 3) is the housing 12 which also has four side walls 22. The housing walls 22 form an inverted frusto-pyramidal shaped second enclosure 23 that is open at the top and bottom. It will be observed in FIG. 2 that the first enclosure 19 merges with second enclosure 23, the size and shape of the bottom opening of the upper enclosure 23 being identical to the top opening of enclosure 19. The configuration of the two enclosures, that is the converging-diverging cross sectional areas as viewed from bottom to top in FIG. 2, enhances the draft characteristics of the structure.

Detachably resting within the second enclosure 23 (FIG. 3) is the horizontally disposed trash grate 13, upon which leaves and trash are placed for incineration. The grate 13 is rectangularly shaped and formed from wire or mesh like material. By virtue of the frusto-pyramidal shape of the enclosure 23, the grate 13 will rest within the enclosure 23 without requiring shoulders or ledges on the interior of the housing sidewalls 18.

Figure 2:
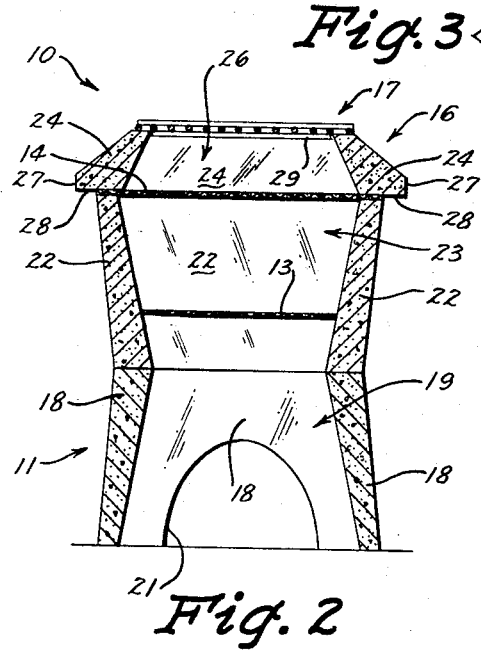
FIG. 2 is an enlarged sectional view taken along the line 2—2 in FIG. 1.

The foraminous rectangularly shaped charcoal grate 14 (FIG. 3) is detachably mounted on top of the housing 12. As the right angular shape of the grate 14 is greater than the opening of the housing 12, it is readily laid upon the upper surface of the housing 12, as best illustrated in FIG. 2. The dual purpose of the charcoal grate 14 is to hold charcoal briquettes or other solid fuel used for barbecuing, and during incineration to act as a fire screen to prevent the escape of burning embers.

Figure 3:
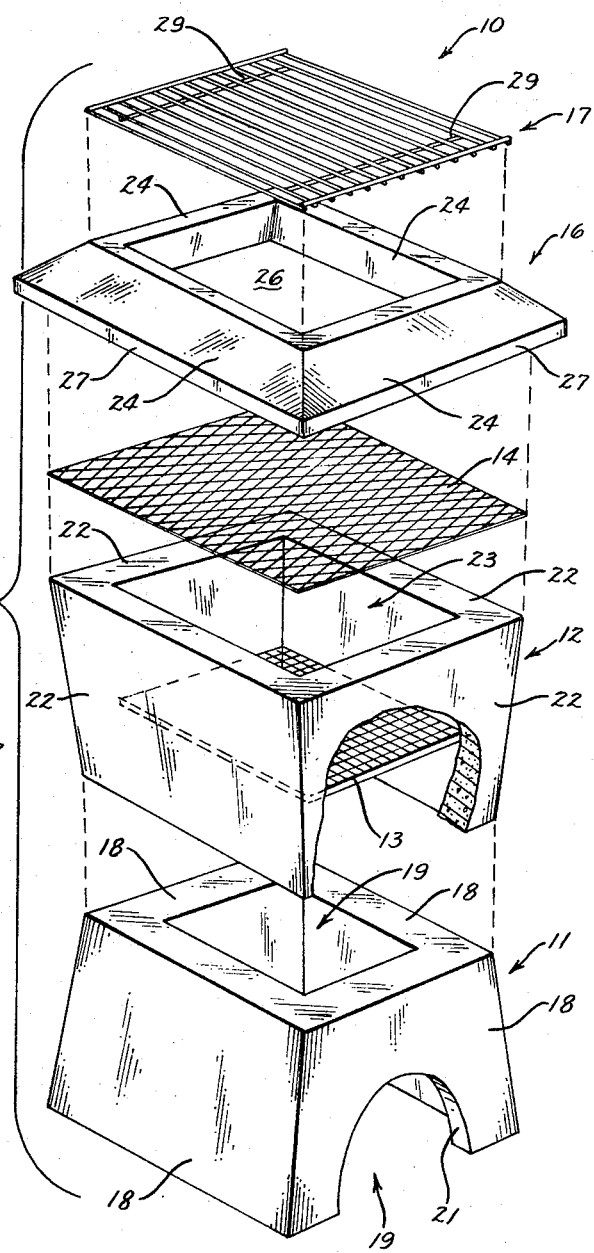
FIG. 3 is an exploded view in perspective, showing all parts of the combination incinerator and barbecue grill.

Detachably mounted on top of the charcoal grate 14 is the top 16 (FIG. 3). The top 16 also has four side walls 24 forming a frusto-pyramidal shaped, third enclosure 26, which is open at the top and bottom. The outer surface 27 at the bottom of the top 16 protrudes laterally outwardly from the periphery of the housing 12, thereby providing a finger gripping ledge 28 (FIG. 2) easily grasped to facilitate the removal of the top 16 from the remainder of the structure. By the third enclosure 26 having an inverted frusto-pyramidal shape, the heat of the burning charcoal briquettes on the grate 14 is caused to be concentrated toward the grill 17, thereby increasing the effectiveness of the heat.

Seated on the top 16 (FIG. 3) is the grill 17. A pair of limit rods 29 are secured, in parallel relation to each other, to the underside of the grill 17, on each side, as viewed in FIG. 3. These rods 29 are positioned and sized to fit into the top of the third enclosure 26 (see FIG. 2) for the purpose of substantially preventing horizontal movement of the grill 17.

In operation, if the incinerator-barbecue grill 10 (FIG. 2) is to be utilized as an incinerator, the grill 17, the top 16, and the charcoal grate 14 are removed, leaving the top of the housing 12 completely open. Leaves and trash can then be easily placed in the second enclosure 23 on the trash grate 13. The charcoal grate 14 is then placed in its normal position as shown in FIG. 2 and a starter fire is prepared in the first enclosure 19, access being had through the opening 21.

To operate the incinerator-barbecue grill 10 (FIG. 2) as a barbecue grill, the grill 17 is removed and charcoal briquettes or other solid fuel is placed on the charcoal grate 14. The fuel is ignited and the grill 17 is reseated. At the appropriate time, food is placed on the grill.

The incinerator-barbecue grill 10 (FIG. 3) can easily be cleaned of ashes and debris. As is observed in FIG. 3, there are no shoulders, ledges, or protuberances of any kind projecting into the enclosure which can prevent debris and ashes from falling to the bottom. By tilting the trash grate 13 from a normally horizontal position to a vertical position, any accumulation thereon would drop into the base enclosure 19. The opening 21 provides easy access to the base enclosure, thus facilitating the removal of ashes and debris therefrom.

Although a preferred embodiment of this invention has been described and disclosed hereinbefore, it is to be remembered that various modifications and alternate constructions can be made thereto without departing from the true spirit and scope of the invention as defined in the appended claims.

I claim:
1. In a combination incinerator and barbecue grill comprising in combination:
   base means having side walls forming a first enclosure therebetween which is open at the top and bottom, one of said side walls having an opening formed therein, with the bottom of said opening being flush with the bottom edge of said base means;
   housing means detachably mounted on said base means, said housing means having side walls forming a second enclosure therebetween which is open at the top and bottom, the inner and outer surfaces of said side walls converging from top to bottom thus forming said second enclosure and said outer surface in an inverted frustum;

first grate means detachably resting in said second enclosure with the periphery of said first grate means supported by said inner surface, said first grate means adapted to hold trash and leaves above said base means for incineration;

top means detachably mounted on said housing means, said top means having side walls forming a third enclosure therebetween which is open at the top and bottom;

second grate means removably mounted between said housing means and said top means, said second grate means adapted to hold charcoal for barbecuing; and grill means detachably seated on said top means.

2. In a combination incinerator and barbecue grill as defined in claim 1, wherein the bottom of said top means protrudes laterally outwardly from the periphery of the top of said housing means thereby providing a graspable ledge for facilitating the removal of said top means from said housing means.

3. In a combination incinerator and barbecue grill as defined in claim 2, wherein said first enclosure has a frusto shape thus providing a constricted area between said base means and said housing means.

4. In a combination incinerator and barbecue grill as defined in claim 3, wherein said third enclosure has a frusto shape wherein the rising heat from the charcoal converges.

References Cited

UNITED STATES PATENTS

| | | | |
|---|---|---|---|
| 1,545,584 | 7/1925 | Devereux | 126—25 |
| 1,565,120 | 12/1925 | Thompson | 110—19 X |
| 1,575,024 | 3/1926 | Weber | 110—18 |
| 1,607,309 | 11/1926 | Romig | 110—8 |
| 1,955,641 | 4/1934 | Lane | 110—19 |
| 2,513,580 | 7/1950 | Milligan | 126—25 |

FREDERICK L. MATTESON, JR., *Primary Examiner.*

E. G. FAVORS, *Assistant Examiner.*